United States Patent
Zhang et al.

(10) Patent No.: US 12,284,213 B2
(45) Date of Patent: Apr. 22, 2025

(54) METHOD FOR DOMAIN NAME DETECTION, DEVICE AND STORAGE MEDIUM

(71) Applicant: Beijing Volcano Engine Technology Co., Ltd., Beijing (CN)

(72) Inventors: Wenbin Zhang, Beijing (CN); Wei Zeng, Beijing (CN); Xiaodong Su, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/815,535

(22) Filed: Aug. 26, 2024

(65) Prior Publication Data
US 2025/0080578 A1    Mar. 6, 2025

(30) Foreign Application Priority Data
Aug. 29, 2023   (CN) .......................... 202311101918.0

(51) Int. Cl.
*H04L 61/4511*    (2022.01)
*H04L 9/40*    (2022.01)
(Continued)

(52) U.S. Cl.
CPC ...... *H04L 63/1483* (2013.01); *H04L 61/4511* (2022.05); *H04L 63/0435* (2013.01);
(Continued)

(58) Field of Classification Search
CPC ....... H04L 63/14; H04L 63/20; H04L 63/205; H04L 63/0435; H04L 63/1408;
(Continued)

(56) References Cited

U.S. PATENT DOCUMENTS 10,679,088 B1    6/2020   Dalal et al.
11,348,269 B1 *  5/2022   Ebrahimi Afrouzi ... G01S 17/48
(Continued)

FOREIGN PATENT DOCUMENTS

AU    2009229679 A1 * 11/2010   ............ G06F 16/00
CN    102664878 A    9/2012
(Continued)

OTHER PUBLICATIONS

China Patent Application No. 202311101918.0; Office Action; dated May 23, 2024; 13 pages.
(Continued)

*Primary Examiner* — Khanh Q Dinh
(74) *Attorney, Agent, or Firm* — BakerHostetler

(57) ABSTRACT

A method for domain name detection, a device and a storage medium are provided. The method includes: matching a to-be-detected domain name with a preset domain name set; in response to the to-be-detected domain name being not in the preset domain name set, calculating an edit distance between at least part of level domain names of the to-be-detected domain name and a preset domain name keyword in a domain name keyword set; in response to an edit distance between a target level domain name and a target preset domain name keyword being smaller than preset distance threshold, acquiring a character pair in which the target level domain name differs from the target preset domain name keyword, and matching with a similar character pair set; and in response to determining the character pair being in the similar character pair set, determining that the to-be-detected domain name has a security risk.

20 Claims, 4 Drawing Sheets

(51) Int. Cl.
*H04L 61/30* (2022.01)
*H04L 61/3015* (2022.01)

(52) U.S. Cl.
CPC .......... *H04L 63/1408* (2013.01); *H04L 63/16* (2013.01); *H04L 61/30* (2013.01); *H04L 61/3025* (2013.01); *H04L 63/14* (2013.01)

(58) Field of Classification Search
CPC ... H04L 63/1483; H04L 63/00; H04L 63/162; H04L 63/16; H04L 61/3025; H04L 61/4511
USPC ................................. 709/206, 220, 223–228
See application file for complete search history.

(56) References Cited

U.S. PATENT DOCUMENTS

| | | | | |
|---|---|---|---|---|
| 2015/0156168 | A1* | 6/2015 | McLaughlin | G06F 3/0482 707/767 |
| 2015/0159294 | A1* | 6/2015 | Ida | C25F 7/02 205/668 |
| 2015/0215271 | A1* | 7/2015 | Gupta | G06F 16/951 707/722 |
| 2015/0347423 | A1* | 12/2015 | Jheeta | G06Q 30/06 707/767 |
| 2015/0365393 | A1* | 12/2015 | Shyamsunder | H04L 67/10 726/4 |
| 2018/0113933 | A1* | 4/2018 | Lewis | G06F 40/205 |
| 2018/0330015 | A1 | 11/2018 | Ogren | |
| 2021/0289040 | A1* | 9/2021 | Arsenault | H04L 67/5681 |
| 2022/0026920 | A1* | 1/2022 | Ebrahimi Afrouzi | G06N 7/01 |
| 2022/0066456 | A1* | 3/2022 | Ebrahimi Afrouzi | G06F 3/04883 |
| 2022/0187841 | A1* | 6/2022 | Ebrahimi Afrouzi | G05D 1/0274 |

FOREIGN PATENT DOCUMENTS

| | | | |
|---|---|---|---|
| CN | 103428307 | A | 12/2013 |
| CN | 105491033 | A | 4/2016 |
| CN | 109800762 | A | 5/2019 |
| CN | 110781876 | A | 2/2020 |
| CN | 113596016 | A | 11/2021 |
| CN | 114254069 | A | 3/2022 |
| CN | 115481285 | B | 6/2023 |
| CN | 116886322 | A * | 10/2023 |
| CN | 116896479 | A * | 10/2023 |
| WO | WO-2009017941 | A1 * | 2/2009 ......... G06F 17/3064 |

OTHER PUBLICATIONS

"Summary of image similarity calculation methods"; https://zhuanlan.zhihu.com/p/483401892; Zhuanlan; accessed Aug. 20, 2024; 15 pages (contains English Translation).

Zhu Yi et al.; "Lightweight detection technology of typosquatting based on visual features"; Journal of Computer Applications Computer; vol. 40(8); Aug. 2020; p. 2279-2285 (contains English Translation).

Lu Pin et al.; "Towards Typosquatting Abuse Detection using Bi-directional LSTM"; ACTA Electronica Sinica; vol. 46 No. 9; Sep. 2018; p. 2081-2086; (clean Abstract, see p. 7).

International Patent Application No. PCT/CN2024/113968; Int'l Search Report and Written Opinion; dated Oct. 24, 2024; 20 pages.

* cited by examiner

METHOD FOR DOMAIN NAME DETECTION, DEVICE AND STORAGE MEDIUM

CROSS-REFERENCE TO RELATED APPLICATION

This application claims the priority to and benefits of the Chinese Patent Application No. 202311101918.0, which was filed on Aug. 29, 2023 and is hereby incorporated by reference in its entirety.

TECHNICAL FIELD

Embodiments of the present disclosure relate to a technical field of computer and network communication, and in particular, to a method for domain name detection, a device and a storage medium.

BACKGROUND

The counterfeit domain name resembles a regular domain name, which is confusing and misleading, and easily make the user mistake as a trustworthy regular domain name. The counterfeit domain name is often used for phishing, sending spam or phishing mails, C2 servers, etc. It is a common means of cyber-attack with low cost and wide range of harm.

A basic method for counterfeit domain name detection is to calculate an edit distance between a keyword of a to-be-detected domain name and a keyword of a target domain name, and if the edit distance is less than or equal to a preset threshold, determine that the to-be-detected domain name is a counterfeit domain name of the target domain name.

However, the accuracy of the above method for counterfeit domain name detection is not high, and there are a large number of false positives.

SUMMARY

At least one embodiment of the present disclosure provides a method for domain name detection, a device or a storage medium.

At least one embodiment of the present disclosure provides a method for domain name detection, which includes:
  matching a to-be-detected domain name with a preset domain name set, where the preset domain name set includes a plurality of trusted domain names;
  in response to the to-be-detected domain name being not in the preset domain name set, calculating an edit distance between at least part of level domain names of the to-be-detected domain name and a preset domain name keyword in a domain name keyword set, where the domain name keyword set is constructed and generated based on a keyword in a trusted domain name;
  in response to an edit distance between a target level domain name and a target preset domain name keyword being smaller than a preset distance threshold, acquiring a character pair in which the target level domain name differs from the target preset domain name keyword, and matching the character pair with a similar character pair set, where the similar character pair set includes a plurality of similar character pairs, each similar character pair includes two visually similar characters or strings; and
  in response to determining that the character pair is in the similar character pair set, determining that the to-be-detected domain name has a security risk.

At least one embodiment of the present disclosure provides a device for domain name detection, which includes:
  a domain name matching unit, configured to match a to-be-detected domain name with a preset domain name set, where the preset domain name set includes a plurality of trusted domain names;
  an edit distance calculating unit, configured to, in response to the to-be-detected domain name being not in the preset domain name set, calculate an edit distance between at least part of level domain names of the to-be-detected domain name and a preset domain name keyword in a domain name keyword set, where the domain name keyword set is constructed and generated based on a keyword in a trusted domain name; and
  a similar character pair matching unit, configured to, in response to an edit distance between a target level domain name and a target preset domain name keyword being smaller than a preset distance threshold, acquire a character pair in which the target level domain name differs from the target preset domain name keyword, and match the character pair with a similar character pair set, where the similar character pair set includes a plurality of similar character pairs, each similar character pair includes two visually similar characters or strings.

At least one embodiment of the present disclosure provides an electronic device, which includes at least one processor and at least one memory,
  where the at least one memory stores computer-executable instructions, and the at least one processor executes the computer-executable instructions stored in the at least one memory, causing the at least one processor to implement the method for domain name detection described above.

At least one embodiment of the present disclosure provides a non-transient computer-readable storage medium, which stores computer-executable instructions, the computer-executable instructions upon being executed by a processor, implementing the method for domain name detection described above.

At least one embodiment of the present disclosure provides a computer program product, which includes computer-executable instructions that, when executed by a processor, implement the method for domain name detection described above.

BRIEF DESCRIPTION OF DRAWINGS

To clearly illustrate the technical solution of the embodiments of the present disclosure, the drawings required in the description of the embodiments will be briefly described in the following; it is obvious that the described drawings are only some embodiments of the present disclosure. For those skilled in the art, other drawings can be obtained based on these drawings without any inventive work.

DETAILED DESCRIPTION

Figure 1:
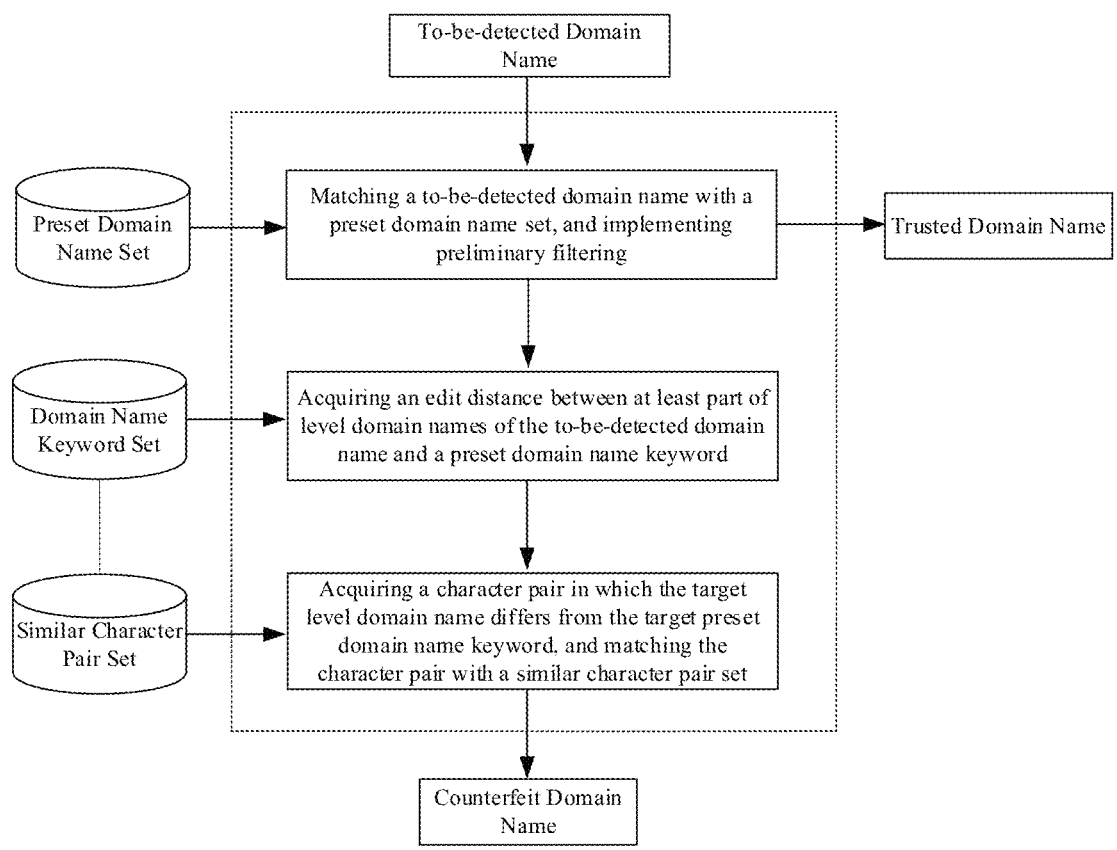
FIG. 1 is a schematic diagram of a method for domain name detection according to an embodiment of the present disclosure.

To make the objects, technical solutions and advantages of the present disclosure clearer, the technical solutions of the embodiments of the present disclosure will be described clearly and fully understandable in conjunction with the drawings related to the embodiments of the present disclosure. Apparently, the described embodiments are just a part but not all the embodiments of the present disclosure. Based on the described embodiments herein, those skilled in the art can obtain other embodiment(s), without any inventive work, which should be within the scope of the present disclosure.

A basic method for counterfeit domain name detection is to calculate an edit distance between a keyword of a to-be-detected domain name and a keyword of a target domain name, and if the edit distance is less than or equal to a preset threshold, determine that the to-be-detected domain name is a counterfeit domain name of the target domain name. The edit distance is a quantitative measurement of the degree of difference between two given strings, the smaller the edit distance, the more similar the two strings, and when the two strings are equal, the edit distance is zero. The measurement is made by determining at least how many operations are required to convert one string into the other, where permissible transformation operation includes insertion, deletion, and substitution.

However, the above method for counterfeit domain name detection determines whether to counterfeit or not by measuring the similarity only in terms of the edit distance, and the edit distance is difficult to sufficiently represent the visual similarity. Especially, because the domain name is a non-repeatable and rare asset, after a large number of featured domain names are registered, other people cannot register them anymore. It becomes very difficult to find a featured and non-repeatable domain name when registering a domain name. This makes it often possible for a domain name registrant to register some domain names similar to the existing domain name, which leads to a large number of normal and non-malicious similar domain names when detecting counterfeit domain names. In addition, there are a large number of malicious counterfeit domain names that use the keywords of existing domain names or business entities directly in the domain names without modifying, so that the similarity-based algorithms directly fail, resulting in a large number of false positives. Therefore, the accuracy of the above method for counterfeit domain name detection is not high, and there are a large number of false positives. The method for counterfeit domain name detection in a practical scenario requires an effective scheme to improve the accuracy and exclude a large number of noise interferences.

In order to solve the above technical problem, the present disclosure provides a method for domain name detection, which introduces a visual feature in the counterfeit domain name detection process, to detect the counterfeit domain name from a visual perspective. And a noise reduction scheme is added to reduce the occurrence of false positives. Some trusted domain names can be preliminarily filtered out by a preset domain name set, which plays a certain role in noise reduction and reduces the amount of data. For the to-be-detected domain name that is not filtered out, a preset domain name keyword that differs less in degree from at least part of level domain names of the to-be-detected domain name can be found out from the domain name keyword set based on the edit distance, and thus whether the to-be-detected domain name is counterfeit or not can be judged from the perspective of visual feature in combination with a similar character pair set. Thus, a counterfeit domain name can be effectively detected, improving the accuracy and reducing the false positives, and the algorithm is simple, easy to implement, and has low complexity and performance overhead.

The method for domain name detection of the present disclosure is applicable on an electronic device such as a server. As shown in FIG. 1, by matching a to-be-detected domain name with a preset domain name set, so as to implement preliminary filtering, where the preset domain name set includes a plurality of trusted domain names. If the to-be-detected domain name is not in a preset domain name set, an edit distance between at least part of level domain names of the to-be-detected domain name and a preset domain name keyword in a domain name keyword set is calculated, where the domain name keyword set is constructed and generated based on a keyword in any trusted domain name. If the edit distance between a target level domain name and a target preset domain name keyword being smaller than a preset distance threshold, a character pair in which the target level domain name differs from the target preset domain name keyword is acquired, and the character pair is matched with a similar character pair set, where the similar character pair set includes a plurality of similar character pairs, each similar character pair includes two visually similar characters or strings. If it is determined that the character pair is in the similar character pair set, it is determined that the to-be-detected domain name has a security risk.

A detailed introduction to the method for domain name detection of the present disclosure is made below in conjunction with specific embodiments.

Figure 2:
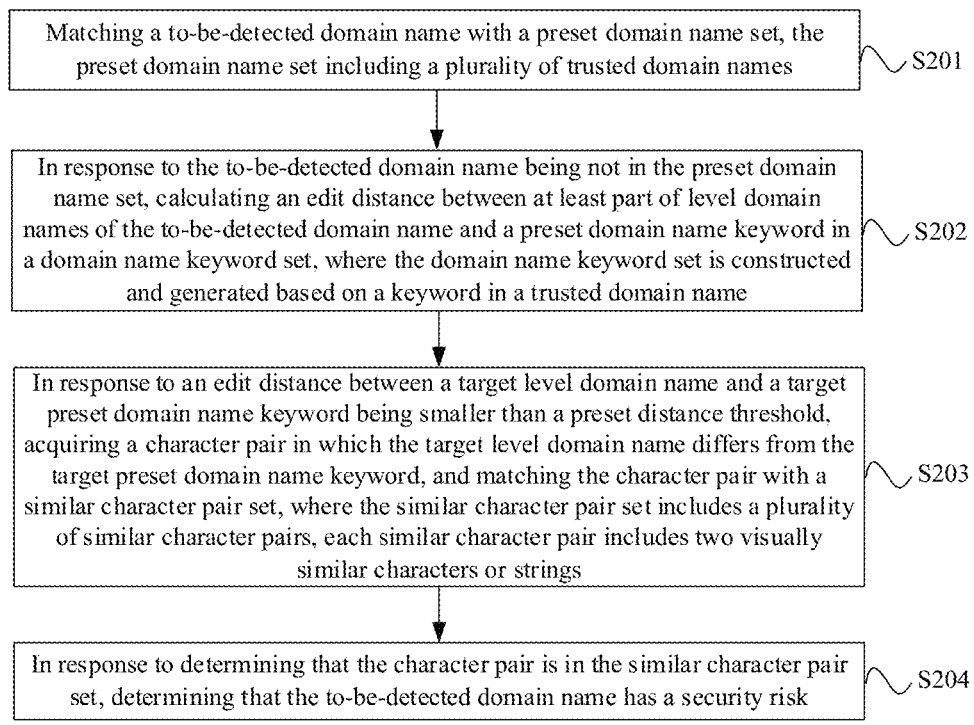
FIG. 2 is a flowchart of a method for domain name detection according to an embodiment of the present disclosure.

Referring to FIG. 2, FIG. 2 is a flowchart of a method for domain name detection according to an embodiment of the present disclosure. The method of this embodiment may be applied in an electronic device such as a terminal device or a server, and the method for domain name detection includes:

S201, matching a to-be-detected domain name with a preset domain name set, the preset domain name set including a plurality of trusted domain names.

In the present embodiment, the preset domain name set may be a domain name set constructed offline (may also be updated in real time), in which a plurality of trusted domain names (legitimate domain names or non-malicious domain names) may be included, or in other words, the preset domain name set may be a domain name whitelist. The trusted domain names in the preset domain name set may be set manually. Of course, considering that the access amount of the counterfeit domain names is generally low, the electronic device may also acquire some domain names with high access amount to be added to the preset domain name set.

Alternatively, historical access amount data of a plurality of alternative domain name during a past preset period is acquired, for example, the average number/frequency of accesses of each alternative domain name in cycles such as hours, days, weeks, months, etc. over a recent period of time, such as a month. If the historical access amount data of any of the alternative domain names exceeds a preset access amount threshold during the past preset period, the alternative domain name may be added to a preset domain name set to construct the preset domain name set.

In this embodiment, on the basis of a preset domain name set, the to-be-detected domain name is matched with a trusted domain name in the preset domain name set, if the to-be-detected domain name is in the preset domain name set, that is, the to-be-detected domain name is completely the same as one of the trusted domain names in the preset domain name set, it can be determined that the to-be-detected domain name is a trusted domain name (a legitimate domain name or a non-malicious domain name), without performing subsequent steps. If the to-be-detected domain name is not in the preset domain name set, the subsequent steps need to be performed for further judgement.

In this embodiment, by filtering the preset domain name set, the trusted domain names belonging in the preset domain name set can be filtered out, thereby reducing the amount of data that needs to perform the subsequent steps, reducing the processing pressure of the subsequent steps. In particular, if the trusted domain names in the preset domain name set are domain names filtered based on historical access amount data, filtering the to-be-detected domain names based on the preset domain name set is equivalent to filtering the to-be-detected domain names based on the access amount data (access baseline), considering the fact that the accesses of the counterfeit domain names are generally low.

S202, in response to the to-be-detected domain name being not in the preset domain name set, calculating an edit distance between at least part of level domain names of the to-be-detected domain name and a preset domain name keyword in a domain name keyword set, where the domain name keyword set is constructed and generated based on a keyword in a trusted domain name.

In this embodiment, the domain name keyword set may be constructed offline (and may also be updated in real-time) and include domain name keywords, which may be keywords of some trusted domain names (e.g., some high-access domain names), such as a second level domain name or a third level domain name of the domain names, etc. If a domain name is abc.xyz.com, the second level domain name xyz may be added to the preset domain name set as a domain name keyword, and optionally, the third level domain name abc may be added to the preset domain name set as a domain name keyword. The preset domain name keywords in the preset domain name set may be set manually, or the electronic device may extract keywords on the basis of some trusted domain names (e.g., some domain names with high access amount) itself, and the domain name keyword set is constructed. The trusted domain name may be derived from the preset domain name set described above, or may be any other trusted domain name.

In this embodiment, after determining that the to-be-detected domain name is not in the preset domain name set, an edit distance between at least part of level domain names of the to-be-detected domain name and a preset domain name keyword in the domain name keyword set may be calculated. The edit distance is a quantitative measure of the degree of difference between two given strings, the smaller the edit distance, the more similar the two strings, and when the two strings are equal, the edit distance is zero. The measurement is made by determining at least how many operations are required to convert one string into the other, where permissible transformation operation includes insertion, deletion, and substitution. In this embodiment, an edit distance between each level domain name of the to-be-detected domain name and each preset domain name keyword of the domain name keyword set may be calculated, and then it is determined whether the calculated edit distance is smaller than a preset distance threshold (e.g., 2 or 3), so as to find a preset domain name keyword having a smaller degree of difference with each level domain name of the to-be-detected domain name.

Because the top level domain name (like .com, .net, .cn, etc.) is not included in the domain name keyword set, the top level domain name of the to-be-detected domain name may be ignored when calculating the edit distance between at least part of level domain names of the to-be-detected domain name and the preset domain name keyword in the domain name keyword set. Alternatively, the to-be-detected domain name may be divided by dot delimiter (".") before calculating the edit distance of at least part of level domain names of the to-be-detected domain name and the preset domain name keyword in the domain name keyword set, to obtain each level domain name of the to-be-detected domain name, and the top level domain name is ignored.

S203, in response to an edit distance between a target level domain name and a target preset domain name keyword being smaller than a preset distance threshold, acquiring a character pair in which the target level domain name differs from the target preset domain name keyword, and matching the character pair with a similar character pair set, where the similar character pair set includes a plurality of similar character pairs, each similar character pair includes two visually similar characters or strings.

In this embodiment, when finding a preset domain name keyword that differs less in degree from at least part of level domain names of the to-be-detected domain name from the domain name keyword set based on the edit distance, there are two possibilities in consideration of the fact that a level domain name of the to-be-detected domain name differs less in degree from a preset domain name keyword: it may not be deliberately counterfeited, but the character combination of the level domain name itself is comparatively similar to the preset domain name keyword; or it may be deliberately counterfeited, the counterfeit domain name usually purposefully modify a few characters of the normal domain name, particularly by replacing visually similar characters, which is a common trick of the counterfeit domain name. The generated counterfeit domain name is highly similar to the original domain name and can easily be mistaken as a normal domain name that has been counterfeited. In this embodiment, a similar character pair set is constructed in advance, the similar character pair set includes a plurality of visually similar character pairs, the similar character pair set may include visually similar single-character pairs such as c and o, g and 9, i and 1, i and 1, o and 0, and the like, and may include visually similar string pairs such as oo and 00, oo and 00, oo and 00, oao and oa0, obo and ob0, etc., where the similar string pairs may not be limited in terms of the number of characters included therein. It is further determined whether the to-be-detected domain name is counterfeited with a similar character pair based on the similar character pair set.

Specifically, if an edit distance between any target level domain name of the to-be-detected domain name and any target preset domain name keyword is smaller than a preset distance threshold, a character pair in which the target level domain name of the to-be-detected domain name differs from the target preset domain name keyword (which may be determined when calculating the edit distance) may be acquired. For example, there is a difference between a character (or string) in the target level domain name and a character (or string) in the target preset domain name keyword, these two different characters (or strings) are taken out from the target level domain name and the target preset domain name keyword, respectively, and a character pair is constructed. And then the character pair is matched with a similar character pair set. It is determined whether the character pair is in the similar character pair set, and if the character pair is not in the similar character pair set, it indicates that the target level domain name is not a counterfeit target preset domain name keyword; if the character pair is in the similar character pair set, it indicates that the target level domain name counterfeits the target preset domain name keyword.

S204, in response to determining that the character pair is in the similar character pair set, determining that the to-be-detected domain name has a security risk.

In this embodiment, based on the above steps, if an edit distance between at least one target level domain name of the to-be-detected domain name and any one target preset domain name keyword is smaller than a preset distance threshold, and a character pair in which the target level domain name differs from the target preset domain name keyword is in a similar character pair set, it is determined that the to-be-detected domain name has a security risk, and the to-be-detected domain name is a counterfeit domain name that is counterfeited based on the target preset domain name keyword and has a security risk for being used in cyber-attacks.

The method for domain name detection provided by the embodiment, by matching a to-be-detected domain name with a preset domain name set, where the preset domain name set includes a plurality of trusted domain names; in response to the to-be-detected domain name being not in the preset domain name set, calculating an edit distance between at least part of level domain names in the to-be-detected domain name and a preset domain name keyword in a domain name keyword set, where the domain name keyword set is constructed and generated based on a keyword in a trusted domain name; in response to an edit distance between a target level domain name and a target preset domain name keyword being smaller than a preset distance threshold, acquiring a character pair in which the target level domain name differs from the target preset domain name keyword, and matching the character pair with a similar character pair set, where the similar character pair set includes a plurality of similar character pairs, each similar character pair includes two visually similar characters or strings; and in response to determining that the character pair is in the similar character pair set, determining that the to-be-detected domain name has a security risk. In this embodiment, some trusted domain names can be preliminarily filtered out by a preset domain name set, which plays a certain role in noise reduction and reduces the amount of data. For the to-be-detected domain name that is not filtered out, a preset domain name keyword that differs less in degree from at least part of level domain names of the to-be-detected domain name can be found out from the domain name keyword set based on the edit distance, and thus whether the to-be-detected domain name is counterfeit or not can be judged from the perspective of visual feature in combination with a similar character pair set. Thus, a counterfeit domain name can be effectively detected, improving the accuracy and reducing the false positives, and the algorithm is simple, easy to implement, and has low complexity and performance overhead.

On the basis of the above embodiment, if the edit distance between at least one target level domain name of the to-be-detected domain name and any target preset domain name keyword is smaller than the preset distance threshold, and all the character pairs in which the target level domain name differs from the target preset domain name keyword are not in the similar character pair set, it cannot be directly determined that the to-be-detected domain name is not a counterfeit domain name, because the target level domain name has a high similarity with the target preset domain name keyword. It is also possible that the target level domain name is obtained by swapping the positions of partial characters in the target preset domain name keyword. For example, the target level domain name cbad only swaps the positions of a and c in relation to the target preset domain name keyword abcd for counterfeiting. Therefore, after determining that an edit distance between any target level domain name of the to-be-detected domain name and any target preset domain name keyword is smaller than a preset distance threshold, and a character pair in which the target level domain name differs from the target preset domain name keyword is not in the similar character pair set, it may be judged whether the target level domain name is obtained by swapping the positions of partial characters in the target preset domain name keyword. If it is determined that the target level domain name is obtained by swapping the positions of partial characters in the target preset domain name keyword, it is determined that the to-be-detected domain name has a security risk.

Alternatively, if the target level domain name is short, it is easier to distinguish visually if only partial characters are swapped between the target level domain name and the target preset domain name keyword, and the probability that it is not a counterfeit is also relatively high. And only if the target level domain name is long enough, swapping characters is confusing and it is more likely to be a counterfeit of the target preset domain name keyword. Therefore, in the above embodiment, when determining that the character pair is not in the similar character pair set and judging whether the target level domain name is obtained by swapping positions of partial characters in the target preset domain name keyword, includes:

in response to determining that the character pair is not in the similar character pair set, judging whether a length of the target level domain name exceeds a preset length; and in response to determining that the length of the target level domain name exceeds the preset length, judging whether the target level domain name is obtained by swapping the positions of partial characters in the target preset domain name keyword.

That is, the judging whether the target level domain name is obtained by swapping the positions of partial characters in the target preset domain name keyword, is performed only for the target level domain name whose length exceeds the preset length, and the target level domain name whose length does not exceed the preset length is ignored. If the target level domain name does not exceed the preset length, it is directly determined that the target level domain name is not counterfeit for the target preset domain name keyword without judging whether the target level domain name is obtained by swapping the positions of partial characters in the target preset domain name keyword.

Figure 3:
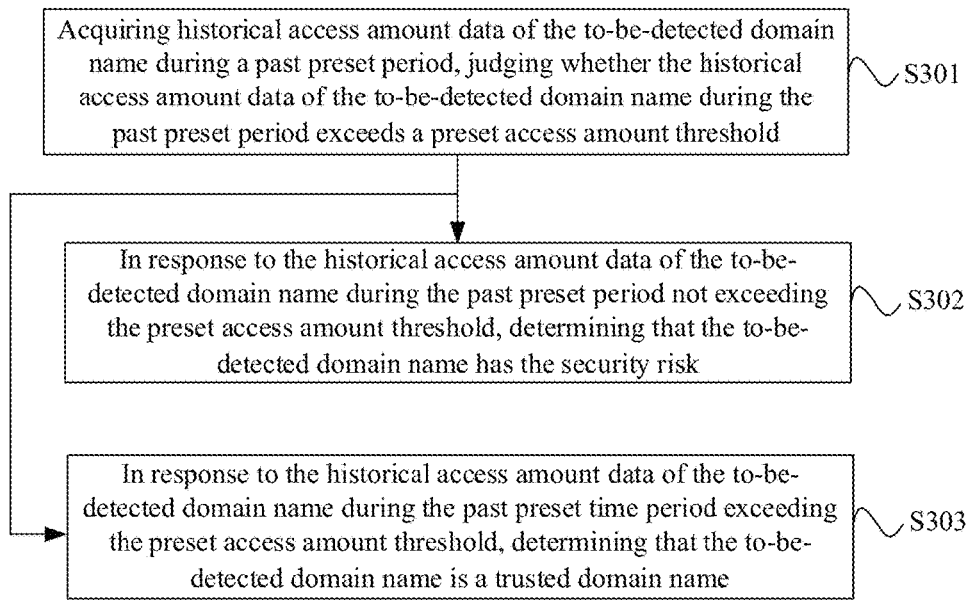
FIG. 3 is a flowchart of a method for domain name detection according to another embodiment of the present disclosure.

On the basis of the above embodiment, considering that noise interference still exists with the above method for domain name detection, further noise reduction may be performed on the basis of the above method for domain name detection, specifically, as shown in FIG. 3, before finally determining that the to-be-detected domain name has a security risk, noise reduction may be further performed by the following steps to finally determine whether the to-be-detected domain name is a counterfeit domain name:

S301, acquiring historical access amount data of the to-be-detected domain name during a past preset period, judging whether the historical access amount data of the to-be-detected domain name during the past preset period exceeds a preset access amount threshold;

S302, in response to the historical access amount data of the to-be-detected domain name during the past preset period not exceeding the preset access amount threshold, determining that the to-be-detected domain name has the security risk, or S303, in response to the historical access amount data of the to-be-detected domain name during the past preset time period exceeding the preset access amount threshold, determining that the to-be-detected domain name is a trusted domain name.

In the present embodiment, considering that the malicious counterfeit domain name generally has a much smaller access amount than a normal domain name in order to reduce the probability of being found, the counterfeit domain name determined in the previous step is filtered again by the access amount data, thereby filtering out domain names with higher access amount data, thereby achieving noise reduction, and drastically reducing the number of false positives detected. The historical access amount data of the to-be-detected domain name during the past preset period may include, but is not limited to, the number of accesses in the last hour, the number of access hours in the last day, the number of access days in the last week, and the like.

On the basis of the above embodiment, the steps of the method for domain name detection are as follows.

A to-be-detected domain name is matched with a preset domain name set. If the to-be-detected domain name is in the preset domain name set, it is determined that the to-be-detected domain name is a trusted domain name; otherwise, if the to-be-detected domain name is not in the preset domain name set, each level domain name (ignoring the top level domain name) in the to-be-detected domain name is acquired, and an edit distance between each level domain name and a preset domain name keyword in the domain name keyword set is calculated. For example, for a target level domain name (e.g., a second level domain name), a preset domain name keyword may be taken out of the domain name keyword set, and then an edit distance between the preset domain name keyword and the target level domain name is calculated. If the edit distance is not less than a preset distance threshold, a next preset domain name keyword is taken out of the domain name keyword set; if the edit distance is smaller than a preset distance threshold, characters in which the preset domain name keyword differs from the target level domain name is acquired to construct a character pair, and the character pair is matched with a similar character pair set. If it is determined that the character pair is in the similar character pair set, it is determined that the target level domain name counterfeits the preset domain name keyword, and the to-be-detected domain name is determined as a counterfeit domain name. If it is determined that the character pair is not in the similar character pair set, it is judged whether the length of the target level domain name exceeds a preset length, and if the length of the target level domain name does not exceed the preset length, the next preset domain name keyword is taken out of the domain name keyword set, and the above process is re-executed. If the length of the target level domain name exceeds the preset length, it is judged whether the target level domain name is obtained by swapping the positions of partial characters in the target preset domain name keyword. If so, the to-be-detected domain name is determined as a counterfeit domain name; if not, the next preset domain name keyword is taken from the domain name keyword set, and the above process is re-executed.

Further, after it is determined that the to-be-detected domain name is a counterfeit domain name by the above process, it is further possible to acquire historical access amount data of the to-be-detected domain name during a past preset period, and then finally determine whether the to-be-detected domain name is a counterfeit domain name based on the historical access amount data of the to-be-detected domain name during the past preset period. If the historical access amount data of the to-be-detected domain name during the past preset period does not exceed a preset access amount threshold, it is finally determined that the to-be-detected domain name has the security risk. If the historical access amount data of the to-be-detected domain name exceeds the preset access amount threshold during the past preset period, it is determined that the to-be-detected domain name is a trusted domain name, i.e., the above process is misjudged.

On the basis of any of the above embodiments, before matching the character pair with the similar character pair set, it is also necessary to acquire the similar character pair set in advance, and the similar character pair set may be constructed manually or may be constructed as follows:

S401, acquiring images of different single-characters and images of different strings, where a string includes at least two characters;

S402, acquiring a similarity between images, determining a similar character pair based on the similarity between the images, and adding the similar character pair to the similar character pair set to construct the similar character pair set.

In the present embodiment, the similar character pair set may include visually similar single-character pairs such as c and o, g and 9, i and 1, i and 1, o and 0, etc., and may include visually similar string pairs such as oo and 00, oo and 00, oo and 00, oao and oa0, obo and ob0, etc., where the similar string pairs may not be limited in terms of the number of characters included therein.

So firstly, for the alphabetic and numeric character sets used for the domain name, a-z, 0-9, acquiring images of all possible character and string pairs are acquired, includes:

1) saving each character as an image;
2) combining characters two by two, such as aa, ab, 00, 01, a1, a2, etc., and saving them as images;
3) combining characters three by three, or even more, such as aaa, abc, aaaa, aaab, etc., and saving them as images.

Figure 4:
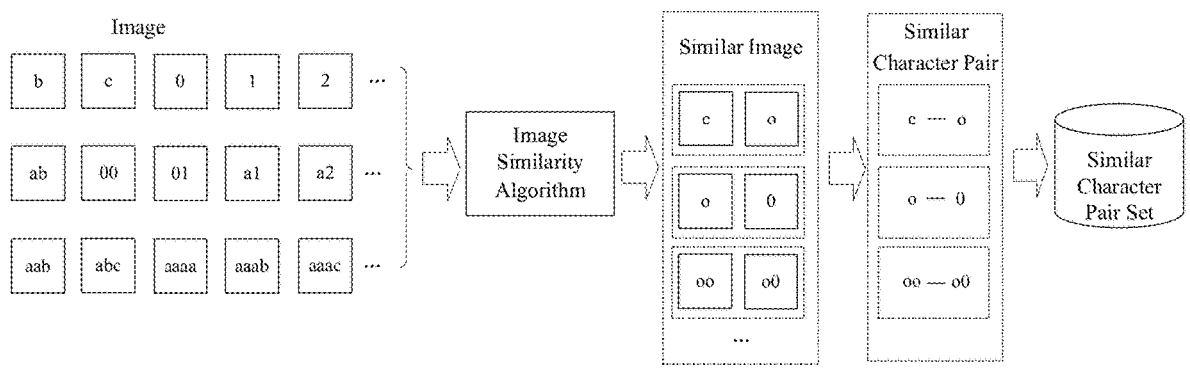
FIG. 4 is a schematic diagram of a construction process of a similar character pair set according to an embodiment of the present disclosure.

Further, as shown in FIG. 4, an image similarity algorithm is used to find similar images from the above images, and then the characters or strings corresponding to the similar images respectively are determined as a similar character pair, thereby constructing a similar character pair set. The image similarity algorithm may be any algorithm such as a cosine similarity algorithm, a hash algorithm, a histogram algorithm, a deep learning algorithm, and the like, which is not limited here.

When acquiring a similarity between the images, and determining a similar character pair based on the similarity between the images, a similarity between images of different single-characters may be acquired, and in response to a similarity between images of two single-characters being greater than a preset similarity threshold, the two single-characters may be determined as a similar character pair; and/or a similarity between images of different strings may be acquired, and in response to a similarity between images of two strings being greater than the preset similarity threshold, the two strings may be determined as a similar character pair.

In the present embodiment, by constructing a similar character pair set based on visual features (image similarity) in advance, it is possible to better find similar character pairs that are easily confused, providing a basis for judgment of a counterfeit domain name.

Figure 5:
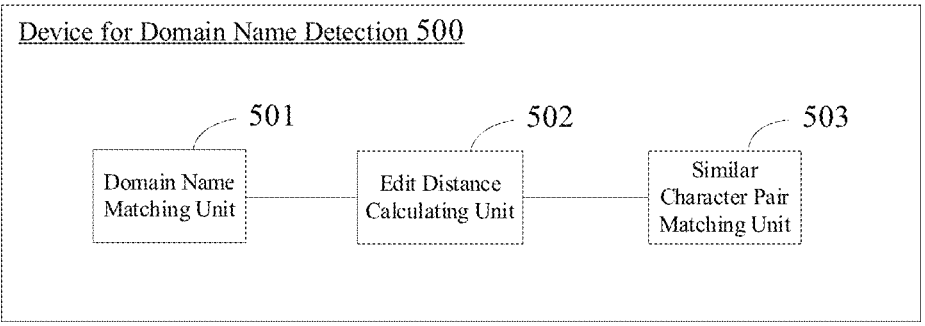
FIG. 5 is a structural block diagram of a device for domain name detection according to an embodiment of the present disclosure.

Corresponding to the method for domain name detection of the above embodiment, FIG. 5 is a structural block diagram of a device for domain name detection provided by an embodiment of the present disclosure. For convenience of explanation, only parts related to the embodiments of the present disclosure are shown. Referring to FIG. 5, the device for domain name detection 500 includes a domain name matching unit 501, an edit distance calculating unit 502, a similar character pair matching unit 503.

The domain name matching unit 501 is configured to match a to-be-detected domain name with a preset domain name set, where the preset domain name set includes a plurality of trusted domain names.

The edit distance calculating unit 502 is configured to, in response to the to-be-detected domain name being not in the preset domain name set, calculate an edit distance between at least part of level domain names of the to-be-detected domain name and a preset domain name keyword in a domain name keyword set, where the domain name keyword set is constructed and generated based on a keyword in a trusted domain name.

The similar character pair matching unit 503 is configured to, in response to an edit distance between a target level domain name and a target preset domain name keyword being smaller than a preset distance threshold, acquire a character pair in which the target level domain name differs from the target preset domain name keyword, and match the character pair with a similar character pair set, where the similar character pair set includes a plurality of similar character pairs, each similar character pair includes two visually similar characters or strings; and in response to determining that the character pair is in the similar character pair set, determine that the to-be-detected domain name has a security risk.

In one or more embodiments of the present disclosure, the device further includes a character swapping judgment module, which is configured to:
in response to determining that the character pair is not in the similar character pair set, judge whether the target level domain name is obtained by swapping positions of partial characters in the target preset domain name keyword; and
in response to determining that the target level domain name is obtained by swapping the positions of partial characters in the target preset domain name keyword, determine that the to-be-detected domain name has a security risk.

In one or more embodiments of the present disclosure, the character swapping judgment module, when in response to determining that the character pair is not in the similar character pair set, judging whether the target level domain name is obtained by swapping positions of partial characters in the target preset domain name keyword, is configured to:
in response to determining that the character pair is not in the similar character pair set, judging whether a length of the target level domain name exceeds a preset length; and
in response to determining that the length of the target level domain name exceeds the preset length, judging whether the target level domain name is obtained by swapping the positions of partial characters in the target preset domain name keyword.

In one or more embodiments of the present disclosure, the device further includes a noise reduction module, which is configured to:
acquire historical access amount data of the to-be-detected domain name during a past preset period, judge whether the historical access amount data of the to-be-detected domain name during the past preset period exceeds a preset access amount threshold; and
in response to the historical access amount data of the to-be-detected domain name during the past preset period not exceeding the preset access amount threshold, determine that the to-be-detected domain name has the security risk, or
in response to the historical access amount data of the to-be-detected domain name during the past preset time period exceeding the preset access amount threshold, determine that the to-be-detected domain name is a trusted domain name.

In one or more embodiments of the present disclosure, the device further includes an offline processing module, which is configured to:
acquire historical access amount data of a plurality of alternative domain names during a past preset period; and
in response to historical access amount data of an alternative domain name during the past preset period exceeding a preset access amount threshold, add the alternative domain name to the preset domain name set to construct the preset domain name set.

In one or more embodiments of the present disclosure, the offline processing module is further configured to:
acquire images of different single-characters and images of different strings, where a string includes at least two characters; and
acquire a similarity between images, determine a similar character pair based on the similarity between the images, and add the similar character pair to the similar character pair set to construct the similar character pair set.

In one or more embodiments of the present disclosure, the offline processing module, when acquiring a similarity between the images and determining a similar character pair based on the similarity between the images, is configured to:
acquire a similarity between images of different single-characters, and in response to a similarity between images of two single-characters being greater than a preset similarity threshold, determine the two single-characters as a similar character pair; and/or
acquire a similarity between images of different strings, and in response to a similarity between images of two strings being greater than the preset similarity threshold, determine the two strings as a similar character pair.

In one or more embodiments of the present disclosure, the edit distance calculating unit 502, before calculating an edit distance between at least part of level domain names of the to-be-detected domain name and a preset domain name keyword in a domain name keyword set, is further configured to:

divide the to-be-detected domain name by a dot delimiter to obtain at least part of level domain names of the to-be-detected domain name, and ignore a top level domain name.

The device provided by the present embodiment, which can be used to perform the technical solutions of the above method embodiments, is similar in its implementation principle and technical effect, and the present embodiment will not be described in detail here.

Figure 6:
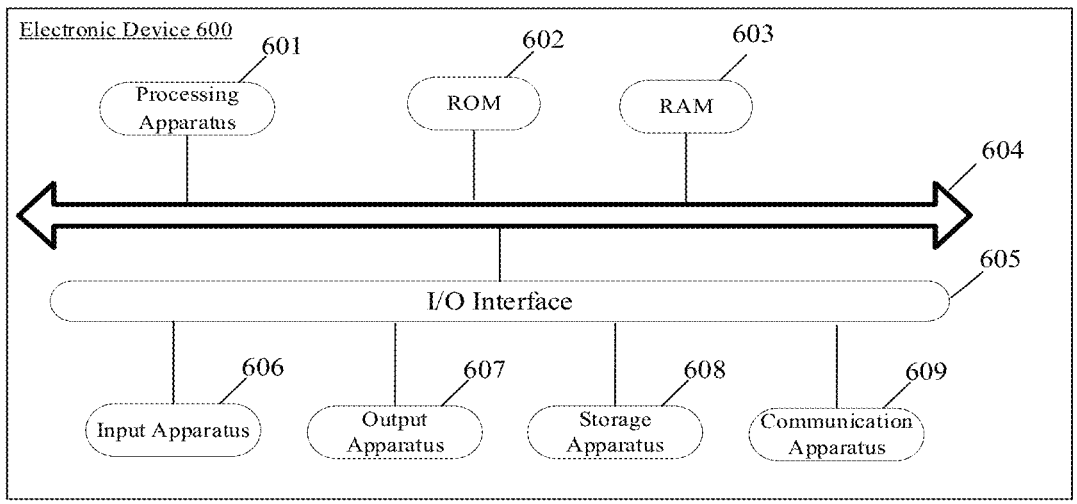
FIG. 6 is a schematic diagram of a hardware structure of an electronic device according to an embodiment of the present disclosure.

Referring to FIG. 6, which shows a structural schematic diagram suitable for achieving the electronic device 600 in the embodiment of the present disclosure. The electronic device 600 may be a terminal device or a server. The terminal device may include but not be limited to a mobile terminal such as a mobile phone, a notebook computer, a digital broadcasting receiver, a personal digital assistant (PDA), a portable android device (PAD), a portable multimedia player (PMP), a vehicle terminal (such as a vehicle navigation terminal), and a fixed terminal such as a digital television (TV) and a desktop computer. The electronic device shown in FIG. 6 is only an example and should not impose any limitations on the functions and use scopes of the embodiments of the present disclosure.

As shown in FIG. 6, the electronic device 600 may include a processing apparatus (such as a central processing unit, and a graphics processor) 601, it may execute a plurality appropriate actions and processes according to a program stored in a read-only memory (ROM) 602 or a program loaded from a storage apparatus 608 to a random-access memory (RAM) 603. In RAM 603, a plurality of programs and data required for operations of the electronic device 600 are also stored. The processing apparatus 601, ROM 602, and RAM 603 are connected to each other by a bus 604. An input/output (I/O) interface 605 is also connected to the bus 604.

Generally, the following apparatuses may be connected to the I/O interface 605: an input apparatus 606 such as a touch screen, a touchpad, a keyboard, a mouse, a camera, a microphone, an accelerometer, and a gyroscope; an output apparatus 607 such as a liquid crystal display (LCD), a loudspeaker, and a vibrator; a storage apparatus 608 such as a magnetic tape, and a hard disk drive; and a communication apparatus 609. The communication apparatus 609 may allow the electronic device 600 to wireless-communicate or wire-communicate with other devices to exchange data. Although FIG. 6 shows the electronic device 600 with a plurality of apparatuses, it is not required to implement or possess all the apparatuses shown. Alternatively, it may implement or possess the more or less apparatuses.

In particular, according to an embodiment of the present disclosure, the process described above with reference to the flowchart may be achieved as a computer software program. For example, an embodiment of the present disclosure includes a computer program product, it includes a computer program carried on a computer-readable medium, and the computer program includes program codes for executing the method shown in the flowchart. In such an embodiment, the computer program may be downloaded and installed from the network by the communication apparatus 609, or installed from the storage apparatus 608, or installed from ROM 602. When the computer program is executed by the processing apparatus 601, the above functions defined in the method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More examples of the computer-readable storage medium may include but not be limited to: an electric connector with one or more wires, a portable computer magnetic disk, a hard disk drive, a RAM, a ROM, an erasable programmable read-only memory (EPROM or flash memory), an optical fiber, a compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt a plurality of forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

The above-mentioned computer-readable medium may be included in the electronic device described above, or may exist alone without being assembled into the electronic device.

The above-mentioned computer-readable medium carries one or more programs which, when executed by the electronic device, cause the electronic device to perform the method in the above-mentioned embodiments.

The computer program code for executing the operation of the present disclosure may be written in one or more programming languages or combinations thereof, the above programming language includes but is not limited to object-oriented programming languages such as Java, Smalltalk, and C++, and further includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including local area network (LAN) or wide area network (WAN), or may be connected to an external computer (such as connected by using an internet service provider through the Internet).

The flowcharts and the block diagrams in the drawings show possibly achieved system architectures, functions, and operations of systems, methods, and computer program products according to a plurality of embodiments of the present disclosure. At this point, each box in the flowchart or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flowchart, as well as combinations of the boxes in the block diagram and/or the flowchart, may be achieved by using a dedicated hardware-based system that performs the specified function or operation, or may be achieved by using combinations of dedicated hardware and computer instructions.

The units described in the embodiments of the present disclosure may be implemented by means of software or by means of hardware. The name of the unit does not constitute a limitation for the unit itself in a case.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard part (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

One or more embodiments of the present disclosure provide a method for domain name detection, which includes:
matching a to-be-detected domain name with a preset domain name set, where the preset domain name set includes a plurality of trusted domain names;
in response to the to-be-detected domain name being not in the preset domain name set, calculating an edit distance between at least part of level domain names of the to-be-detected domain name and a preset domain name keyword in a domain name keyword set, where the domain name keyword set is constructed and generated based on a keyword in a trusted domain name;
in response to an edit distance between a target level domain name and a target preset domain name keyword being smaller than a preset distance threshold, acquiring a character pair in which the target level domain name differs from the target preset domain name keyword, and matching the character pair with a similar character pair set, where the similar character pair set includes a plurality of similar character pairs, each similar character pair includes two visually similar characters or strings; and
in response to determining that the character pair is in the similar character pair set, determining that the to-be-detected domain name has a security risk.

According to one or more embodiments of the present disclosure, the method further includes:
in response to determining that the character pair is not in the similar character pair set, judging whether the target level domain name is obtained by swapping positions of partial characters in the target preset domain name keyword; and
in response to determining that the target level domain name is obtained by swapping the positions of partial characters in the target preset domain name keyword, determining that the to-be-detected domain name has a security risk.

According to one or more embodiments of the present disclosure, the in response to determining that the character pair is not in the similar character pair set, judging whether the target level domain name is obtained by swapping positions of partial characters in the target preset domain name keyword includes:
in response to determining that the character pair is not in the similar character pair set, judging whether a length of the target level domain name exceeds a preset length; and
in response to determining that the length of the target level domain name exceeds the preset length, judging whether the target level domain name is obtained by swapping the positions of partial characters in the target preset domain name keyword.

According to one or more embodiments of the present disclosure, before the determining that the to-be-detected domain name has a security risk, the method further includes:
acquiring historical access amount data of the to-be-detected domain name during a past preset period, judging whether the historical access amount data of the to-be-detected domain name during the past preset period exceeds a preset access amount threshold; and
in response to the historical access amount data of the to-be-detected domain name during the past preset period not exceeding the preset access amount threshold, determining that the to-be-detected domain name has the security risk, or
in response to the historical access amount data of the to-be-detected domain name during the past preset time period exceeding the preset access amount threshold, determining that the to-be-detected domain name is a trusted domain name.

According to one or more embodiments of the present disclosure, before the matching a to-be-detected domain name with a preset domain name set, the method further includes:
acquiring historical access amount data of a plurality of alternative domain names during a past preset period; and
in response to historical access amount data of an alternative domain name during the past preset period exceeding a preset access amount threshold, adding the alternative domain name to the preset domain name set to construct the preset domain name set.

According to one or more embodiments of the present disclosure, before the matching the character pair with a similar character pair set, the method further includes:

acquiring images of different single-characters and images of different strings, where a string includes at least two characters; and acquiring a similarity between images, determining a similar character pair based on the similarity between the images, and adding the similar character pair to the similar character pair set to construct the similar character pair set.

According to one or more embodiments of the present disclosure, the acquiring a similarity between images, determining a similar character pair based on the similarity between the images includes:

acquiring a similarity between images of different single-characters, and in response to a similarity between images of two single-characters being greater than a preset similarity threshold, determining the two single-characters as a similar character pair; and/or acquiring a similarity between images of different strings, and in response to a similarity between images of two strings being greater than the preset similarity threshold, determining the two strings as a similar character pair.

According to one or more embodiments of the present disclosure, before the calculating an edit distance between at least part of level domain names of the to-be-detected domain name and a preset domain name keyword in a domain name keyword set, the method further includes:

dividing the to-be-detected domain name by a dot delimiter to obtain at least part of level domain names of the to-be-detected domain name, and ignoring a top level domain name.

One or more embodiments of the present disclosure further provide a device for domain name detection, which includes:

a domain name matching unit, configured to match a to-be-detected domain name with a preset domain name set, where the preset domain name set includes a plurality of trusted domain names;

an edit distance calculating unit, configured to, in response to the to-be-detected domain name being not in the preset domain name set, calculate an edit distance between at least part of level domain names of the to-be-detected domain name and a preset domain name keyword in a domain name keyword set, where the domain name keyword set is constructed and generated based on a keyword in a trusted domain name; and a similar character pair matching unit, configured to, in response to an edit distance between a target level domain name and a target preset domain name keyword being smaller than a preset distance threshold, acquire a character pair in which the target level domain name differs from the target preset domain name keyword, and match the character pair with a similar character pair set, where the similar character pair set includes a plurality of similar character pairs, each similar character pair includes two visually similar characters or strings.

According to one or more embodiments of the present disclosure, the device further includes a character swapping judgment module, which is configured to:

in response to determining that the character pair is not in the similar character pair set, judge whether the target level domain name is obtained by swapping positions of partial characters in the target preset domain name keyword; and in response to determining that the target level domain name is obtained by swapping the positions of partial characters in the target preset domain name keyword, determine that the to-be-detected domain name has a security risk.

According to one or more embodiments of the present disclosure, the character swapping judgment module, when in response to determining that the character pair is not in the similar character pair set, judging whether the target level domain name is obtained by swapping positions of partial characters in the target preset domain name keyword, is configured to:

in response to determining that the character pair is not in the similar character pair set, judging whether a length of the target level domain name exceeds a preset length; and in response to determining that the length of the target level domain name exceeds the preset length, judging whether the target level domain name is obtained by swapping the positions of partial characters in the target preset domain name keyword.

According to one or more embodiments of the present disclosure, the device further includes a noise reduction module, which is configured to:

acquire historical access amount data of the to-be-detected domain name during a past preset period, judge whether the historical access amount data of the to-be-detected domain name during the past preset period exceeds a preset access amount threshold; and in response to the historical access amount data of the to-be-detected domain name during the past preset period not exceeding the preset access amount threshold, determine that the to-be-detected domain name has the security risk, or in response to the historical access amount data of the to-be-detected domain name during the past preset time period exceeding the preset access amount threshold, determine that the to-be-detected domain name is a trusted domain name.

According to one or more embodiments of the present disclosure, the device further includes an offline processing module, which is configured to:

acquire historical access amount data of a plurality of alternative domain names during a past preset period; and in response to historical access amount data of an alternative domain name during the past preset period exceeding a preset access amount threshold, add the alternative domain name to the preset domain name set to construct the preset domain name set.

According to one or more embodiments of the present disclosure, the offline processing module is further configured to:

acquire images of different single-characters and images of different strings, where a string includes at least two characters; and acquire a similarity between images, determine a similar character pair based on the similarity between the images, and add the similar character pair to the similar character pair set to construct the similar character pair set.

According to one or more embodiments of the present disclosure, the offline processing module, when acquiring a similarity between the images and determining a similar character pair based on the similarity between the images, is configured to:

acquire a similarity between images of different single-characters, and in response to a similarity between images of two single-characters being greater than a preset similarity threshold, determine the two single-characters as a similar character pair; and/or acquire a similarity between images of different strings, and in response to a similarity between images of two strings being greater than the preset similarity threshold, determine the two strings as a similar character pair.

According to one or more embodiments of the present disclosure, the edit distance calculating unit, before calculating an edit distance between at least part of level domain names of the to-be-detected domain name and a preset domain name keyword in a domain name keyword set, is further configured to:

divide the to-be-detected domain name by a dot delimiter to obtain at least part of level domain names of the to-be-detected domain name, and ignore a top level domain name.

One or more embodiments of the present disclosure further provide an electronic device, which includes at least one processor and at least one memory, where the at least one memory stores computer-executable instructions, and the at least one processor executes the computer-executable instructions stored in the at least one memory, causing the at least one processor to implement the method for domain name detection described above.

One or more embodiments of the present disclosure further provide a non-transient computer-readable storage medium, which stores computer-executable instructions, the computer-executable instructions upon being executed by a processor, implementing the method for domain name detection described above.

One or more embodiments of the present disclosure further provide a computer program product which includes computer-executable instructions that, when executed by a processor, implement the method for domain name detection described above.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a specific order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the specific features and acts described above. Rather, the specific features and acts described above are merely exemplary forms for implementing the claims.

The invention claimed is:

1. A method for domain name detection, comprising:
    matching a to-be-detected domain name with a preset domain name set, wherein the preset domain name set comprises a plurality of trusted domain names;
    in response to the to-be-detected domain name being not in the preset domain name set, calculating an edit distance between at least part of level domain names of the to-be-detected domain name and a preset domain name keyword in a domain name keyword set, wherein the domain name keyword set is constructed and generated based on a keyword in a trusted domain name;
    in response to an edit distance between a target level domain name and a target preset domain name keyword being smaller than a preset distance threshold, acquiring a character pair in which the target level domain name differs from the target preset domain name keyword, and matching the character pair with a similar character pair set, wherein the similar character pair set comprises a plurality of similar character pairs, and each similar character pair comprises two visually similar characters or strings; and
    in response to determining that the character pair is in the similar character pair set, determining that the to-be-detected domain name has a security risk.

2. The method of claim 1, further comprising:
    in response to determining that the character pair is not in the similar character pair set, judging whether the target level domain name is obtained by swapping positions of partial characters in the target preset domain name keyword; and
    in response to determining that the target level domain name is obtained by swapping the positions of partial characters in the target preset domain name keyword, determining that the to-be-detected domain name has a security risk.

3. The method of claim 2, wherein the in response to determining that the character pair is not in the similar character pair set, judging whether the target level domain name is obtained by swapping positions of partial characters in the target preset domain name keyword comprises:
    in response to determining that the character pair is not in the similar character pair set, judging whether a length of the target level domain name exceeds a preset length; and
    in response to determining that the length of the target level domain name exceeds the preset length, judging whether the target level domain name is obtained by swapping the positions of partial characters in the target preset domain name keyword.

4. The method of claim 1, before the determining that the to-be-detected domain name has a security risk, further comprising:
    acquiring historical access amount data of the to-be-detected domain name during a past preset period, judging whether the historical access amount data of the to-be-detected domain name during the past preset period exceeds a preset access amount threshold; and
    in response to the historical access amount data of the to-be-detected domain name during the past preset period not exceeding the preset access amount threshold, determining that the to-be-detected domain name has the security risk, or
    in response to the historical access amount data of the to-be-detected domain name during the past preset time period exceeding the preset access amount threshold, determining that the to-be-detected domain name is a trusted domain name.

5. The method of claim 1, before the matching a to-be-detected domain name with a preset domain name set, further comprising:
acquiring historical access amount data of a plurality of alternative domain names during a past preset period; and
in response to historical access amount data of an alternative domain name during the past preset period exceeding a preset access amount threshold, adding the alternative domain name to the preset domain name set to construct the preset domain name set.

6. The method of claim 1, before the matching the character pair with a similar character pair set, further comprising:
acquiring images of different single-characters and images of different strings, wherein a string comprises at least two characters; and
acquiring a similarity between images, determining a similar character pair based on the similarity between the images, and adding the similar character pair to the similar character pair set to construct the similar character pair set.

7. The method of claim 6, wherein the acquiring a similarity between images, determining a similar character pair based on the similarity between the images comprises:
acquiring a similarity between images of different single-characters, and in response to a similarity between images of two single-characters being greater than a preset similarity threshold, determining the two single-characters as a similar character pair; and/or
acquiring a similarity between images of different strings, and in response to a similarity between images of two strings being greater than the preset similarity threshold, determining the two strings as a similar character pair.

8. The method of claim 1, before the calculating an edit distance between at least part of level domain names of the to-be-detected domain name and a preset domain name keyword in a domain name keyword set, further comprising:
dividing the to-be-detected domain name by a dot delimiter to obtain at least part of level domain names of the to-be-detected domain name, and ignoring a top level domain name.

9. An electronic device, comprising:
at least one processor and at least one memory,
wherein the at least one memory stores computer-executable instructions, and the at least one processor executes the computer-executable instructions stored in the at least one memory, causing the at least one processor to implement a method for domain name detection, and the method comprises:
matching a to-be-detected domain name with a preset domain name set, wherein the preset domain name set comprises a plurality of trusted domain names;
in response to the to-be-detected domain name being not in the preset domain name set, calculating an edit distance between at least part of level domain names of the to-be-detected domain name and a preset domain name keyword in a domain name keyword set, wherein the domain name keyword set is constructed and generated based on a keyword in a trusted domain name;
in response to an edit distance between a target level domain name and a target preset domain name keyword being smaller than a preset distance threshold, acquiring a character pair in which the target level domain name differs from the target preset domain name keyword, and matching the character pair with a similar character pair set, wherein the similar character pair set comprises a plurality of similar character pairs, each similar character pair comprises two visually similar characters or strings; and
in response to determining that the character pair is in the similar character pair set, determining that the to-be-detected domain name has a security risk.

10. The electronic device of claim 9, wherein the method further comprises:
in response to determining that the character pair is not in the similar character pair set, judging whether the target level domain name is obtained by swapping positions of partial characters in the target preset domain name keyword; and
in response to determining that the target level domain name is obtained by swapping the positions of partial characters in the target preset domain name keyword, determining that the to-be-detected domain name has a security risk.

11. The electronic device of claim 10, wherein the in response to determining that the character pair is not in the similar character pair set, judging whether the target level domain name is obtained by swapping positions of partial characters in the target preset domain name keyword comprises:
in response to determining that the character pair is not in the similar character pair set, judging whether a length of the target level domain name exceeds a preset length; and
in response to determining that the length of the target level domain name exceeds the preset length, judging whether the target level domain name is obtained by swapping the positions of partial characters in the target preset domain name keyword.

12. The electronic device of claim 9, wherein before the determining that the to-be-detected domain name has a security risk, the method further comprises:
acquiring historical access amount data of the to-be-detected domain name during a past preset period, judging whether the historical access amount data of the to-be-detected domain name during the past preset period exceeds a preset access amount threshold; and
in response to the historical access amount data of the to-be-detected domain name during the past preset period not exceeding the preset access amount threshold, determining that the to-be-detected domain name has the security risk, or
in response to the historical access amount data of the to-be-detected domain name during the past preset time period exceeding the preset access amount threshold, determining that the to-be-detected domain name is a trusted domain name.

13. The electronic device of claim 9, wherein before the matching a to-be-detected domain name with a preset domain name set, the method further comprises:
acquiring historical access amount data of a plurality of alternative domain names during a past preset period; and
in response to historical access amount data of an alternative domain name during the past preset period exceeding a preset access amount threshold, adding the alternative domain name to the preset domain name set to construct the preset domain name set.

14. The electronic device of claim 9, wherein before the matching the character pair with a similar character pair set, the method further comprises:
   acquiring images of different single-characters and images of different strings, wherein a string comprises at least two characters; and
   acquiring a similarity between images, determining a similar character pair based on the similarity between the images, and adding the similar character pair to the similar character pair set to construct the similar character pair set.

15. The electronic device of claim 14, wherein the acquiring a similarity between images, determining a similar character pair based on the similarity between the images comprises:
   acquiring a similarity between images of different single-characters, and in response to a similarity between images of two single-characters being greater than a preset similarity threshold, determining the two single-characters as a similar character pair; and/or
   acquiring a similarity between images of different strings, and in response to a similarity between images of two strings being greater than the preset similarity threshold, determining the two strings as a similar character pair.

16. The electronic device of claim 9, wherein before the calculating an edit distance between at least part of level domain names of the to-be-detected domain name and a preset domain name keyword in a domain name keyword set, the method further comprises:
   dividing the to-be-detected domain name by a dot delimiter to obtain at least part of level domain names of the to-be-detected domain name, and ignoring a top level domain name.

17. A non-transient computer-readable storage medium, storing computer-executable instructions, wherein the computer-executable instructions upon being executed by a processor, implement a method for domain name detection, and the method comprises:
   matching a to-be-detected domain name with a preset domain name set, wherein the preset domain name set comprises a plurality of trusted domain names;
   in response to the to-be-detected domain name being not in the preset domain name set, calculating an edit distance between at least part of level domain names of the to-be-detected domain name and a preset domain name keyword in a domain name keyword set, wherein the domain name keyword set is constructed and generated based on a keyword in a trusted domain name;
   in response to an edit distance between a target level domain name and a target preset domain name keyword being smaller than a preset distance threshold, acquiring a character pair in which the target level domain name differs from the target preset domain name keyword, and matching the character pair with a similar character pair set, wherein the similar character pair set comprises a plurality of similar character pairs, each similar character pair comprises two visually similar characters or strings; and
   in response to determining that the character pair is in the similar character pair set, determining that the to-be-detected domain name has a security risk.

18. The storage medium of claim 17, wherein the method further comprises:
   in response to determining that the character pair is not in the similar character pair set, judging whether the target level domain name is obtained by swapping positions of partial characters in the target preset domain name keyword; and
   in response to determining that the target level domain name is obtained by swapping the positions of partial characters in the target preset domain name keyword, determining that the to-be-detected domain name has a security risk.

19. The storage medium of claim 18, wherein the in response to determining that the character pair is not in the similar character pair set, judging whether the target level domain name is obtained by swapping positions of partial characters in the target preset domain name keyword comprises:
   in response to determining that the character pair is not in the similar character pair set, judging whether a length of the target level domain name exceeds a preset length; and
   in response to determining that the length of the target level domain name exceeds the preset length, judging whether the target level domain name is obtained by swapping the positions of partial characters in the target preset domain name keyword.

20. The storage medium of claim 17, wherein before the determining that the to-be-detected domain name has a security risk, the method further comprises:
   acquiring historical access amount data of the to-be-detected domain name during a past preset period, judging whether the historical access amount data of the to-be-detected domain name during the past preset period exceeds a preset access amount threshold; and
   in response to the historical access amount data of the to-be-detected domain name during the past preset period not exceeding the preset access amount threshold, determining that the to-be-detected domain name has the security risk, or
   in response to the historical access amount data of the to-be-detected domain name during the past preset time period exceeding the preset access amount threshold, determining that the to-be-detected domain name is a trusted domain name.

\* \* \* \* \*